(12) United States Patent
Pierce (10) Patent No.: US 7,310,913 B2
(45) Date of Patent: Dec. 25, 2007

(54) WIND CAP FOR BUILDINGS

(76) Inventor: Riley G. Pierce, 4209 Arbor Gate, Fort Worth, TX (US) 76133

( * ) Notice: Subject to any disclaimer, the term of this patent is extended or adjusted under 35 U.S.C. 154(b) by 605 days.

(21) Appl. No.: 11/005,233

(22) Filed: Dec. 7, 2004

(65) Prior Publication Data

US 2005/0166468 A1     Aug. 4, 2005

Related U.S. Application Data (60) Provisional application No. 60/534,409, filed on Jan. 7, 2004.

(51) Int. Cl.
     *E04B 7/00*     (2006.01)

(52) U.S. Cl. .................. 52/23; 52/3; 52/DIG. 11; 52/DIG. 12; 52/148; 52/156

(58) Field of Classification Search ............ 52/23, 52/3–5, DIG. 11–12, 148, 156, 166, 698, 52/146, 149, 92.1
See application file for complete search history.

(56) References Cited

U.S. PATENT DOCUMENTS

| | | | |
|---|---|---|---|
| 777,441 A | 12/1904 | Small | |
| 1,864,403 A | 6/1932 | Bradley | |
| 2,548,758 A * | 4/1951 | Agle | 52/641 |
| 3,309,822 A | 3/1967 | Dunkin | |
| 3,335,531 A | 8/1967 | Grimelli et al. | |
| 3,449,874 A * | 6/1969 | Beaupre | 52/149 |
| 3,726,054 A * | 4/1973 | Anderson et al. | 52/23 |
| 3,828,498 A | 8/1974 | Jones | |
| 5,285,603 A * | 2/1994 | Richard et al. | 52/63 |
| 5,311,708 A | 5/1994 | Frye | |
| 5,319,896 A | 6/1994 | Winger | |
| 5,355,640 A | 10/1994 | Frye | |
| 5,384,993 A | 1/1995 | Phillips | |
| 5,388,378 A | 2/1995 | Frye | |
| 5,448,861 A | 9/1995 | Lawson | |
| 5,491,935 A | 2/1996 | Coxum | |
| 5,537,786 A | 7/1996 | Lozier et al. | |
| 5,570,545 A | 11/1996 | Adams | |
| 5,579,794 A | 12/1996 | Sporta | |
| 5,623,788 A | 4/1997 | Bimberg et al. | |
| 5,687,512 A | 11/1997 | Spoozak et al. | |
| 5,791,090 A | 8/1998 | Gitlin et al. | |
| 5,819,477 A | 10/1998 | Gaffney | |
| 5,983,572 A | 11/1999 | Laboy | |
| 6,088,975 A | 7/2000 | Wiegel | |

(Continued)

*Primary Examiner*—Richard E. Chilcot, Jr.
*Assistant Examiner*—Chi Q. Nguyen
(74) *Attorney, Agent, or Firm*—Richard C. Litman (57) ABSTRACT

A wind cap for buildings serves to anchor a building structure securely to the underlying terrain. The wind cap is a series of base plates which are temporarily and removably placed upon the roof of a structure, with a corresponding series of tiedown straps secured over the plates and attached to ground anchors on opposite sides of the structure. Two of the base plate components may be hinged together along their common edges for placement over the ridge line of the roof. Single plates are placed along the eaves and at intermediate points of the roof span. Each plate includes at least one pair of roller support arms adjustably extending upwardly therefrom, with a roller installed between each arm pair. The rollers eliminate the drag of the tiedown strap passing thereover, thereby eliminating asymmetrical loads on the underlying plates and roof as the straps are tightened.

20 Claims, 5 Drawing Sheets

U.S. PATENT DOCUMENTS

| | | |
|---|---|---|
| 6,161,339 A | 12/2000 | Cornett, Sr. et al. |
| 6,269,593 B1 | 8/2001 | Thompson |
| 6,273,113 B1 * | 8/2001 | Streyckmans ............ 135/88.13 |
| 2001/0037611 A1 | 11/2001 | Cornett, Sr. |
| 2002/0100226 A1 | 8/2002 | Huppert |
| 2002/0134414 A1 | 9/2002 | Gower |
| 2002/0166289 A1 | 11/2002 | Oviedo-Reyes |
| 2002/0189174 A1 | 12/2002 | Thompson |

* cited by examiner

WIND CAP FOR BUILDINGS

CROSS-REFERENCE TO RELATED APPLICATION

This application claims the benefit of U.S. Provisional Patent Application Ser. No. 60/534,409, filed Jan. 7, 2004.

BACKGROUND OF THE INVENTION

1. Field of the Invention

The present invention relates generally to assemblies and systems for securing roofs to their underlying structures in order to avoid damage due to high winds. More particularly, the present invention comprises a series of tiedown straps which are secured to corresponding ground anchors on opposite sides of a building structure, and which pass over corresponding bearing plates placed upon the roof structure. The bearing plates each include one or more rollers extending upwardly therefrom, upon which the tiedown straps bear.

2. Description of the Related Art

Wind damage to building structures is a common result when high winds occur, particularly in the case of conventional frame structures having gabled roofs. The roofs of such structures generally depend upon their weight to achieve most of their security, and high winds can create enough lifting force to completely counteract the weight of the roof upon the structure. When this occurs, the roof, or portions thereof, are often blown away, with the underlying structure being weakened and exposed to further damage when the roof is removed.

As a result, many different systems and devices have been developed for securing a roof positively to its underlying structure, and/or to the terrain underlying and/or surrounding the structure. Many such systems incorporate straps or cables, which are anchored to the foundation of the underlying structure, or to the surrounding terrain. Most such systems further incorporate some type of bearing plates or the like, which are placed atop the roof for the cables or straps to bear against in order to avoid damage to the roof covering (shingles, etc.) due to chafing of the cables or straps thereon.

However, a characteristic of such systems is that the cables or straps must be stretched longitudinally over the roof and the bearing plates or the like thereon. The cables or straps generally have on the order of a few hundred pounds of force applied to them, in order to exert a positive downward force upon the underlying roof. This results in a certain amount of longitudinal resistance along the length of the cables or straps, as they drag against their underlying bearing plates. The result of this can be uneven forces applied to the cables or straps, with the frictional drag pulling the bearing plates in a direction along the length of the straps or cables, rather than applying a purely compressive load to the roof structure to hold it in place. Depending upon the specific direction and magnitude of such longitudinal forces along the straps or cables applied to the bearing plates, the forces may be additive to the horizontal wind loads applied to the structure and may weaken the structure further, even though the roof is being held securely in place.

The present invention provides a solution to the above problem by reducing the friction between the tiedown straps used with the present invention, and the underlying bearing plates. Each of the bearing plates includes at least a pair of spaced apart support arms extending therefrom, with the distal ends of each pair of support arms having a roller secured therebetween. The tiedown straps bear against the rollers, which are free to rotate or revolve upon their axles extending across the support arm pair. Thus, practically no longitudinal force is transferred to the underlying base plate resting upon the roof structure. Rather, substantially all of the force developed by the tiedown strap against the underlying bearing plate comprises a compressive force, acting to force the plate directly against the roof structure. This also equalizes the tensile forces along each segment of the tiedown strap, between each of the rollers and between the outermost rollers and the opposed ground anchors.

The present wind cap assembly provides numerous advantages over many other previously developed systems. Using the present system, no modifications are required to the building structure or to its foundation. The tiedown straps never contact the building structure itself; only the bearing plates contact the roof structure. Also, the tiedown straps and bearing plates are easily removed when not needed, and may be quickly reinstalled when needed once the ground anchors have been installed.

A discussion of the related art of which the present inventor is aware, and its differences and distinctions from the present invention, is presented below.

U.S. Pat. No. 777,441 issued on Dec. 13, 1904 to Wily Small, titled "Roof Anchoring Device," describes a holddown system comprising a series of cables which extend over the roof of the structure from opposite ground anchors. The Small system requires that the roof be modified with cable passages along the eaves, and the cable guides placed upon the roof structure are permanently secured to the roof by nails or screws. Small provides cable guides in the form of longitudinal channels through which the cables pass, but no means (rollers, etc.) is provided for reducing the friction of the cables as they are stretched across the roof structure and through the guides. Finally, Small also provides a ridge line base plate having an angle therein corresponding to the gable angle of the roof, but Small must provide separate plates for each different gable angle, as his ridge line plates are formed as unitary, monolithic components having fixed gable angles formed therein.

U.S. Pat. No. 1,864,403 issued on Jun. 21, 1932 to Charles B. Bradley, titled "House Anchor," describes a system more closely related to that of the above noted '441 U.S. patent to Small than to the present invention. The Bradley system comprises a series of eyebolts which are screwed permanently into the roof structure, along with holes formed in the eaves for passage of the cables therethrough. As in the case of the Small roof anchoring system discussed above, Bradley fails to provide any means for reducing the friction of the tiedown lines as they pass through the guides, nor does he provide any means for adjusting the relative positions of the lines and guides.

U.S. Pat. No. 3,309,822 issued on Mar. 21, 1967 to William H. Dunkin, titled "Exterior Anchoring Apparatus For Surface Sheet," describes a series of tie rods and clamps for securing corrugated or other sheet panels to a roof. The Dunkin system does not anchor the roof to any underlying structure and cannot prevent the entire roof from being blown from the underlying building in a high wind, as can the present invention.

U.S. Pat. No. 3,335,531 issued on Aug. 15, 1967 to Nardie F. Grimelli et al., titled "Tie-Down For House Trailers Or The Like," describes a series of tiedown embodiments for securing a mobile home to the underlying surface. In one embodiment a flexible cable or chain passes through guide channels placed on the structure, in much the same manner as the ridge and eaves mounted channels of the '441 U.S. patent to Small, discussed further above. Grimelli et al. do not provide any means for reducing friction along the length of the cable or means for guiding such a hold down cable over the ridgeline of a gabled roof, as provided by the present invention.

U.S. Pat. No. 3,828,498 issued on Aug. 13, 1974 to Robert A. Jones, titled "Method Of Stabilizing A Comparatively Flat Roofed Structure Against Wind," describes the use of adhesive for the permanent attachment of a relatively large number of concrete blocks atop the roof of a mobile home. The blocks merely add weight and break up the airflow over the roof. Jones does not provide any means of positively tying the blocks or the underlying roof structure to the underlying terrain, as provided by the present invention.

U.S. Pat. No. 5,311,708 issued on May 17, 1994 to Filmore O. Frye, titled "Anchor System For Completed Structures," describes a series of means for securing various components of a building structure to the underlying surface. One embodiment comprises brackets which secure the roof trusses and rafters to the underlying wall stud structure, but not to the underlying terrain. Another embodiment provides for securing the exposed portions of the shingles to the underlying roof sheathing. Yet another embodiment provides for securing the exposed ends of the rafters to the building foundation or to the underlying terrain. None of the embodiments provide tiedown straps or lines which pass over and across the building to secure to opposed ground anchors on opposite sides of the building, nor any low friction guide means for such tiedowns, which features are a part of the present invention.

U.S. Pat. No. 5,319,896 issued on Jun. 14, 1994 to Ronald C. Winger, titled "Apparatus And Method For Securing Building During High Wind Conditions," describes a series of tiedowns which secure to the exposed ends of the rafters and to ground anchors somewhat spaced from the structure. Winger provides for the retraction of his tiedowns into containers secured to the rafters for storage when not required. No tiedown system passing completely over the roof structure and securing to ground anchors on opposite sides of the building structure is disclosed by Winger. Moreover, Winger has no motivation to provide base plates with rollers atop the roof, as provided in the present invention, as his tiedowns do not pass over the roof structure.

U.S. Pat. No. 5,355,640 issued on Oct. 18, 1994 to Filmore O. Frye, titled "Anchor System For Completed Structures," is a divisional patent of the '708 U.S. patent of the same title and to the same patentee discussed further above. The same points raised in the discussion of the '708 U.S. patent are seen to apply here as well.

U.S. Pat. No. 5,384,993 issued on Jan. 31, 1995 to Belton R. Phillips, titled "Tie Down For Building Structures," describes a completely concealed system in which tension rods are secured to brackets holding down the ceiling joists or rafters to the top plates of the walls, with the rods passing through the walls and bottom plates to anchors in the underlying ground. The Phillips anchor system does not pass over the roof, and accordingly does not include any form of base plates and rollers disposed upon the top of the roof for applying force to the roof from overlying tiedown straps.

U.S. Pat. No. 5,388,378 issued on Feb. 14, 1995 to Filmore O. Frye, titled "Anchor System For Completed Structures," is another divisional patent of the '708 U.S. patent of the same title and to the same patentee discussed further above. The same points raised in the discussion of the '708 U.S. patent are seen to apply here as well.

U.S. Pat. No. 5,448,861 issued on Sep. 12, 1995 to Donald L. Lawson, titled "Method And Apparatus For Securing Parts Of A Building To Each Other And To A Foundation," describes the installation of tension straps within the walls of a structure. The bottom ends of the straps are anchored to the foundation of the building, with the upper ends of the straps being secured to brackets, which, in turn, secure to the ceiling joists and/or rafters of the structure. The result more closely resembles the assembly disclosed in the '993 U.S. patent to Phillips, discussed further above, than it does the present invention with its exterior tiedown straps.

U.S. Pat. No. 5,491,935 issued on Feb. 20, 1996 to Thomas Coxum, titled "Roof Anchor System," describes another concealed system in which the tension components are installed within the walls and secure the upper structure to the foundation. The Coxum system thus more closely resembles the assemblies disclosed in the '993 U.S. patent to Phillips and the '861 U.S. patent to Lawson, both discussed further above, than it does the present invention.

U.S. Pat. No. 5,537,786 issued on Jul. 23, 1996 to James P. Lozier et al., titled "Hurricane-Resisting Building Roof Structure Tie-Down," describes a system having a series of guides which permanently attach to the ridge and eaves of the roof, with corresponding straps passing over the guides and anchored to ground anchors on each side of the structure. The Lozier et al. system differs from the present invention in several respects: (1) no rollers are provided to essentially eliminate friction as the tiedown straps are tightened; (2) no adjustment is provided for different gable angles, in the roof ridge guide; (3) Lozier permanently secures all of his tiedown strap guides to the roof structure; (4) Lozier requires that eaves guides of completely different configuration from the roof ridge guide, be attached beneath the eaves of the structure; (5) Lozier also requires that the rain gutters be modified to provide wells through which the tiedown straps pass, rather than providing eaves guides which carry the straps outwardly over and past the gutters, as in the present system; and (6) Lozier secures the lower ends of the straps to the foundation of the structure, rather than to ground anchors somewhat separated from the structure.

U.S. Pat. No. 5,570,545 issued on Nov. 5, 1996 to James A. Adams, titled "Apparatus For Holding A Roof On A Building During High Winds," describes a system in which the tiedown straps passing over the roof secure alternately to opposite rafter ends and over the roof to opposite ground anchors. This has the effect of placing the entire roof under a series of shear forces, with each adjacent tiedown applying a force across the roof opposite that of its neighbor tiedown. Adams provides such a system in order to equalize the lateral forces on the walls beneath the roof, but blowdown of the wall structure has never been a problem so long as the roof remains attached to the structure. However, it is important to relieve lateral stresses on the roof structure, which the present invention accomplishes by means of the base plates and their rollers, over which the tiedown straps pass. Adams fails to provide any form of plate or guide between the tiedown straps and the roof itself. The tiedowns rest directly upon the surface of the roof, where they may abrade the shingles and/or otherwise damage the roof if any play between the tiedowns and the roof surface occurs.

U.S. Pat. No. 5,579,794 issued on Dec. 3, 1996 to Joseph Sporta, titled "Apparatus And Method For Securing An Object Against Gale-Force Winds," describes a large net which is stretched over a mobile home and secured by ground anchors. No guides or other apparatus for preventing direct contact between the net and the underlying structure are disclosed. There would appear to be some problem with entering and exiting the structure with the net in place, as its lower edge appears to be positioned very close to the ground when installed. This is not a problem with the spaced apart tiedown straps used with the present structural tiedown invention.

U.S. Pat. No. 5,623,788 issued on Apr. 29, 1997 to Uwe H. Bimberg et al., titled "Roof Anchoring Apparatus," describes a system in which a series of cables are passed over a corresponding number of bracket assemblies on the roof, to hold the roof firmly in place. The bracket assemblies differ from the present system in that they must be raised above the underlying structure to provide clearance for a downwardly extending flange. The flange extends downwardly past the eaves when installed at that location, but requires additional structure when installed elsewhere on the roof. The present system uses a series of essentially identical base plates, which may be installed singly or as hinged together pairs across the crest of the roof as required. In any event, Bimberg et al. fail to disclose any form of rollers which serve to reduce or essentially eliminate friction between the straps or cables and the underlying roof plates.

U.S. Pat. No. 5,687,512 issued on Nov. 18, 1997 to Norman W. Spoozak et al., titled "Hurricane Lockdown System," describes a roof tiedown assembly comprising a cable contained in the eaves of the roof, with a series of cables connecting the eaves cable to a series of ground anchors. No tiedown straps, cables, or lines pass over the upper surface of the roof, as they do in the present invention. Accordingly, Spoozak et al. do not disclose any form of guides and strap rollers for placement atop a roof, as provided by the present invention. Moreover, the Spoozak et al. system requires modification to the roof or installation during construction of the roof, unlike the present invention which is installed over an existing roof structure with no modification to the roof.

U.S. Pat. No. 5,791,090 issued on Aug. 11, 1998 to Harris M. Gitlin et al., titled "Variable Tension Roofing And Structural Protective Harness," describes the use of an extremely large "shade cloth" stretched over the entire structure and extending to the tiedown anchors installed in the ground surrounding the structure. Gitlin et al. provide rollers along the roof crest, but the cover does not roll back and forth over the rollers as the straps do in the present invention. Rather, the roller is used to roll up the shade cloth material thereon when wind protection is not required. The Gitlin et al. apparatus bears a closer resemblance to the covers disclosed in the '794 U.S. patent to Sporta than it does to the present invention.

U.S. Pat. No. 5,819,477 issued on Oct. 13, 1998 to George Gaffney, titled "Apparatus And Methods For Securing A Building," describes a system using a series of straps which pass over the roof. The straps pass through a series of gabled plates along the crest of the roof, but the straps are not raised above the roof. In fact, the straps pass through slots in the plates and bear directly against the roof surface at the crest. No other bearing plates are provided by Gaffney. In contrast, the straps of the present invention never come in direct contact with the roof structure, but are separated therefrom by a series of base plates along the span of each strap passing over the roof. Moreover, Gaffney does not disclose any rollers or adjustable roller support in the single type of gable plate he provides.

U.S. Pat. No. 5,983,572 issued on Nov. 16, 1999 to Bernabé Laboy, titled "Roof Tie-Down Support Member," describes a series of plates for installation on the surface and along the ridgeline of a roof, with the plates having transverse grooves therein for the installation of transverse cables thereacross. Laboy does not provide any cables extending over and across the ridge of the roof, as provided in the present invention. Moreover, no rollers to minimize friction between the cables and the plates and to equalize tensile forces along the cables between plates are provided by Laboy. In addition, Laboy does not secure his roof tiedown system to the ground, but rather to the underlying building structure. In contrast, the present tiedown system utilizes ground anchors for securing the straps.

U.S. Pat. No. 6,088,975 issued on Jul. 18, 2000 to J. Parr Wiegel, titled "Hurricane Protection For Mobile Homes And Small Buildings," describes a large tarp which is stretched from a ground anchor line on one side of the structure, over the structure to an opposite ground anchor line. Wiegel utilizes a roller having a length equal to that of the tarp, with the roller being installed in the ground or along the eaves of the structure. The tarp is rolled onto the roller for storage. No guide rollers extending from roof plates are provided by Wiegel. The Wiegel apparatus more closely resembles that disclosed in the Gitlin '090 U.S. patent, than it does the present invention.

U.S. Pat. No. 6,161,339 issued on Dec. 19, 2000 to Robert M. Cornett, Sr. et al., titled "Structural Tie-Down Apparatus," describes another system using tension rods concealed within the wall structure. The lower ends of the rods are anchored in the foundation, while the upper ends are secured to a cable installed across the ends of the rafters. This system does not provide any means of securing the roof sheathing, as no external tiedown apparatus is provided.

U.S. Pat. No. 6,269,593 issued on Aug. 7, 2001 to Thomas Thompson, titled "Roof Tie Down Connecting Fork And Yoke," describes a system having a pair of hinged together plates permanently secured to the end gable rafter of a roof structure. A bolt serves as the pintle of the hinge, and extends above the roofline for the securing of roof tiedown components thereto. The lower end of the bolt extends downwardly for the attachment of an anchor strap thereto. The problem with this system is that in most new construction, the end gables are constructed in the field, and are nailed to the prefabricated, otherwise flat trusses used to support the roof. Thus, there is no structural continuity extending from the gable eaves overhang to the rest of the roof structure, other than any roof sheathing which may be applied. Moreover, Thompson does not provide any external anchors extending over the central area of the roof. Rather, he relies entirely upon two opposed anchors at each end of the gabled eaves, which do not provide significant anchoring strength, as noted above. No roof mounted base plates or adjustable strap support rollers are disclosed by Thompson.

U.S. Patent Publication No. 2001/37,611 published on Nov. 8, 2001, titled "Anchor For A Structural Tie-Down Apparatus," is a continuation in part of the issued '339 U.S. Patent, which has already been discussed further above. The same differences noted above between the '339 U.S. patent to Cornett, Sr. et al. and the present invention are seen to apply here, as well.

U.S. Patent Publication No. 2002/100,226 published on Aug. 1, 2002, titled "Truss Anchoring Assembly For Buildings," describes yet another concealed tiedown installation with tension rods passing through the walls and securing to brackets at the rafter ends. The Huppert assembly is more closely related to the systems disclosed in the Lawson '861, Coxum '935, and Cornett, Sr. et al. '339 U.S. patents, each of which has been discussed further above, than it is to the present invention.

U.S. Patent Publication No. 2002/134,414 published on Sep. 26, 2002, titled "Flexible Wind Abatement System," describes still another tarp which is installed to completely cover the building structure. The Gower system thus more closely resembles the tarp covers of the Sporta '794, Gitlin et al. '090, and Wiegel '975 U.S. patents, each of which is discussed further above, than it does the present roof anchor invention.

U.S. Patent Publication No. 2002/166,289 published on Nov. 14, 2002, titled "Building Tie Down Kit For Securing Roofs, Doors, And Windows Against Storm Wind Damage And Method Of Assembly," describes a chain envelope which is secured over the top of a building structure. The result is closer to the various tarps and the like disclosed in the Sporta '794, Gitlin et al. '090, and Wiegel '975 U.S. patents than it is to the present anchoring system invention.

Finally, U.S. Patent Publication No. 2002/189,174 published on Dec. 19, 2002, titled "Retrofit Hurricane And Earthquake Protection," describes a large number of patterns for forming a series of metal brackets, and the brackets formed therefrom, for use in more securely tying together various building components at the time of construction. No external tiedowns or roof plates are provided by Thompson.

None of the above inventions and patents, taken either singly or in combination, is seen to describe the instant invention as claimed. Thus a wind cap for buildings solving the aforementioned problems is desired.

SUMMARY OF THE INVENTION

The present wind cap for buildings generally comprises a series of base plates which are placed upon the roof of a building structure, and held in place by a corresponding number of tiedown straps which are extended over the structure from ground anchors disposed on opposite sides of the structure. The base plates may be provided as pairs secured together along a common hinge line for placement over the crest of the roof, or as individual plates for placement along the eaves or at intermediate points over the span of the roof.

Each of the plates includes two pairs of upstanding roller support arms, with a roller installed between each arm of each pair. The roller support arms may be provided in any lengths desired, so long as the arms comprising any given pair are of equal length. The tiedown straps pass over the rollers, with the rollers serving to essentially eliminate friction and asymmetrical forces acting along the lengths of the tiedown straps as they are pulled taut over the roof.

The base plates provide for the angular adjustment of the support arm attachments thereto, allowing each support arm pair to be adjusted from an orientation normal to the plane of the base plate to some angle to either side of the normal orientation. This allows the arms to be positioned vertically, or at some other angle to extend the rollers outwardly past the eaves and/or gutters of the roof, or to cancel any asymmetric loads on the support arms.

The present wind cap assembly is physically secured only to the ground anchors disposed to each side of the building structure. The only contact with the building is by the bottom surfaces of the base plates, and the base plates are not mechanically or adhesively attached to the roof. The forces generated by the tiedown straps when they are tightened are sufficient to hold the base plates in place on the roof. This allows the assembly to be quickly installed and removed as required, without need to install or remove nails, screws, adhesives, and/or other attachment means.

Accordingly, it is a principal object of the invention to provide a wind cap tiedown system for building structures for preventing displacement of the roof due to high winds.

It is another object of the invention to provide a wind cap tiedown system comprising a series of base plates which are removably placed upon the roof, with a corresponding series of tiedown straps extending over the base plates and secured to ground anchors installed on opposite sides of the structure.

It is a further object of the invention to provide a wind cap tiedown system having a base plate assembly comprising two plates hinged together along their common edges for placement across the ridge line of the roof, and a single base plate for placement along the eaves or intermediate span areas of the roof.

Still another object of the invention is to provide a wind cap tiedown system having a series of upstanding roller support arms and rollers extending from each of the base plates, to essentially eliminate asymmetrical forces of the tiedown straps passing thereover due to friction.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises an apparatus for securing the roofs of building structures against high winds, as may occur in severe storms and hurricanes. The typical roof structure is secured to the underlying structure primarily due to its weight resting upon the structure, with only a relatively few nails securing the trusses and lower rafter ends of the roof to the underlying top plates in a typical frame building construction. However, the typical gabled roof configuration found in most smaller structures is capable of acting as a crude airfoil, and can generate enough lifting forces in high winds to cause the entire roof to separate from the underlying structure. In other cases, winds may generate sufficient force to lift portions of the roof sheathing from the underlying rafters.

Figure 1:
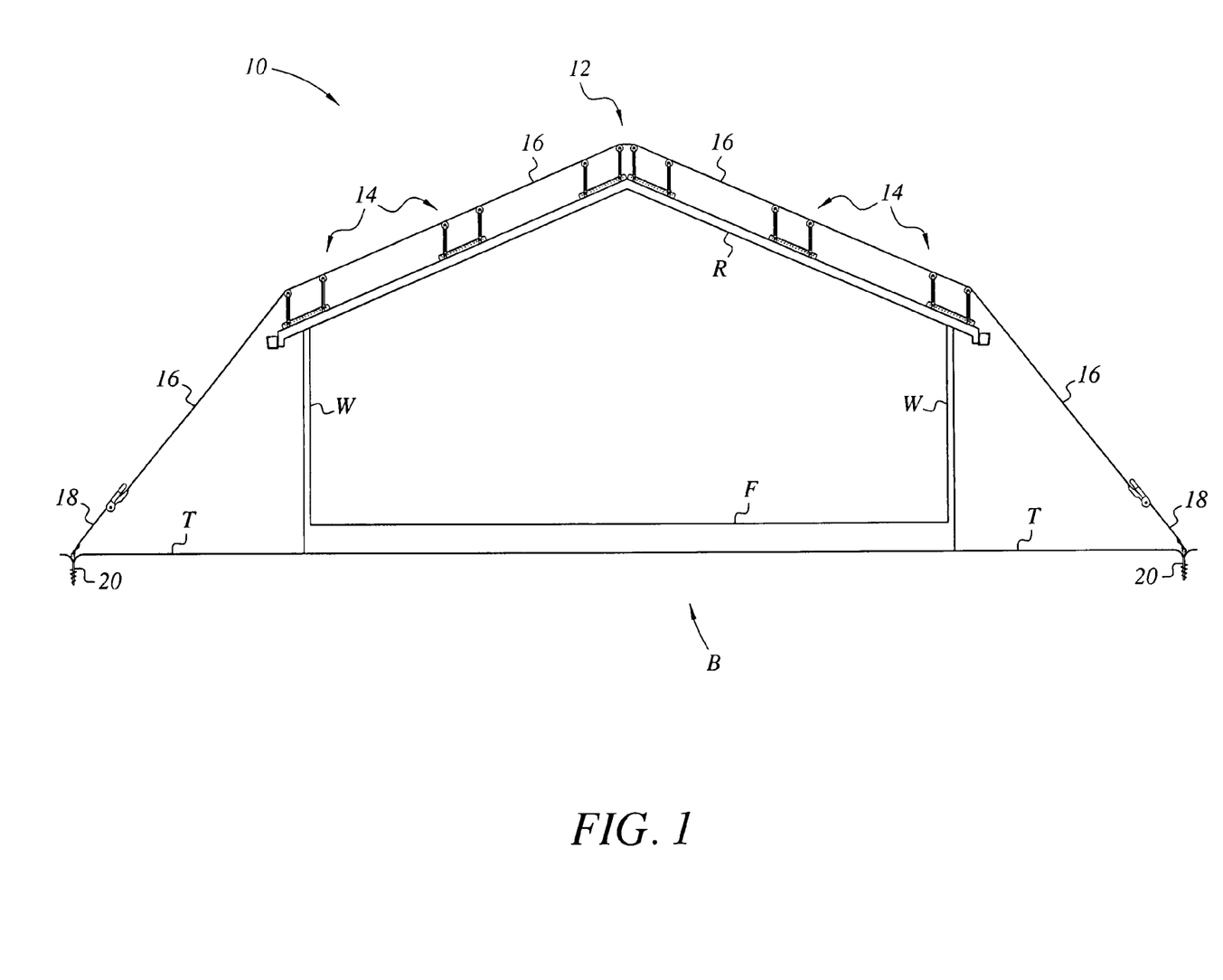
FIG. 1 is a diagrammatic side elevation view of a building structure having the present wind cap installed thereon, showing its general configuration.

The present invention provides a solution to this problem by means of a series of tiedown straps, each of which passes over a series of base plates removably placed upon the roof. The ends of the tiedown straps are anchored in the surrounding terrain on opposite sides of the structure. FIG. 1 provides a side elevation view of a structure, showing the general configuration of an installation of the present wind cap invention 10. The building structure B is conventional, having a floor or foundation F constructed upon the underlying and surrounding terrain T, with walls W and a gabled roof R. In FIG. 1, a series of base plate assemblies 12 and 14 are removably disposed atop the roof structure R, with a series of tiedown straps 16 passing over corresponding plate assemblies 12 and 14. (Only a single tiedown strap 16 is shown in the side elevation view of FIG. 1, but it will be understood that a series of such straps 16 extends across the building roof R, with other straps concealed by the alignment of the first strap 16 therewith.) The opposed ends 18 of the strap 16 are secured to the surrounding terrain T by their respective attachment to opposed ground anchors 20.

Figure 2:
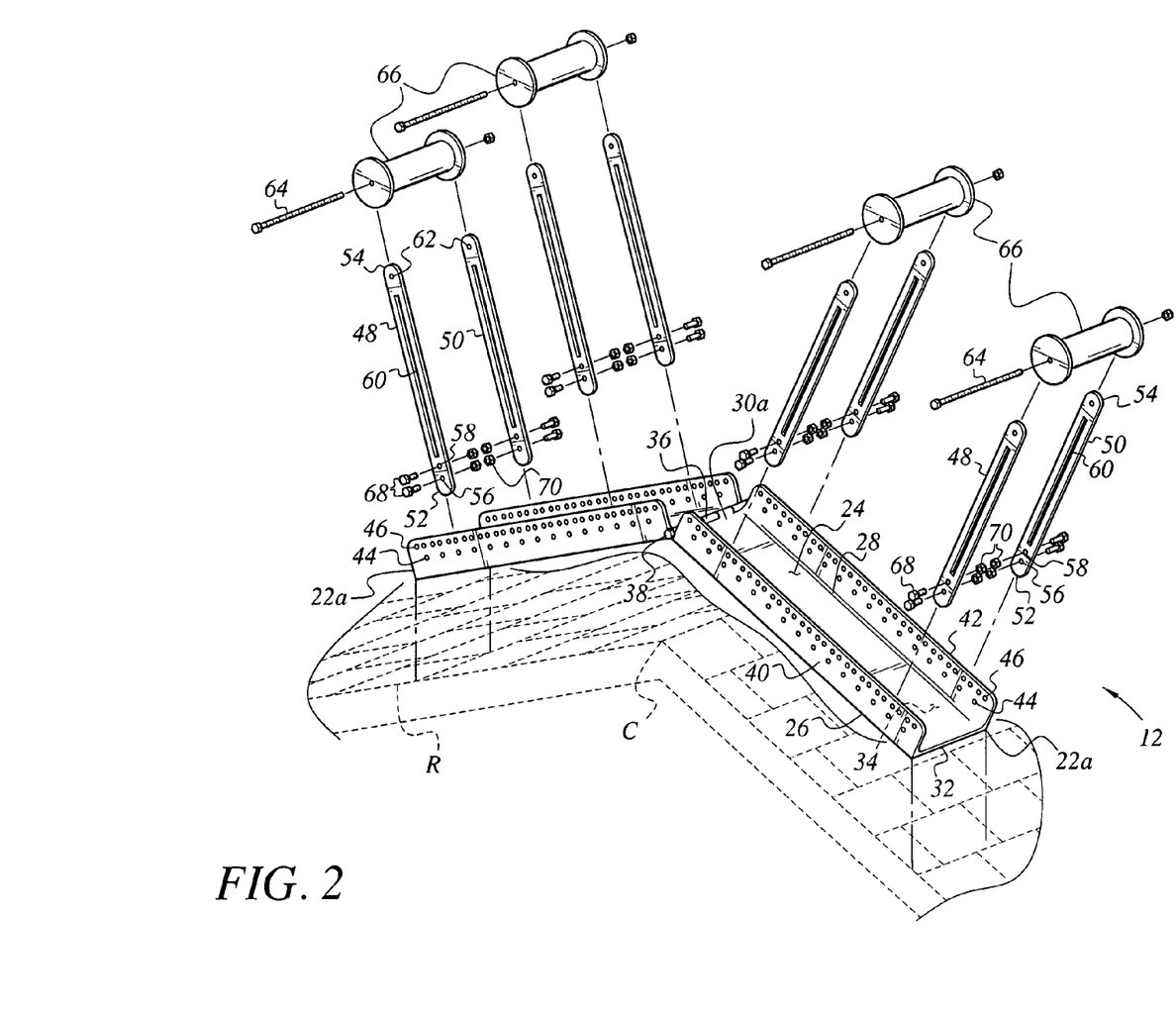
FIG. 2 is an exploded, perspective view of a wind cap assembly of the present invention for installation across a roof ridge, showing various details of the invention.

FIG. 2 provides an exploded perspective view of a roof crest base plate assembly 12, including a pair of base plates 22a pivotally attached by hinges for placement across the crest C of a roof R. Each of the plates 22a includes a floor 24 having opposed first and second edges 26 and 28 and opposed first and second ends 30a and 32. The bottom surfaces 34 of the floors 24 are smooth, with no means being provided for positively attaching the base plate floors 24 to the underlying roof surface. The base plate assembly 12 (and others) is held in place by the compressive force developed by the tiedown strap passing thereover.

The first ends 30a each include a series of mutually complementary hinge lugs 36 extending therefrom, providing for the installation of a hinge pin 38 (e.g., conventional bolt and nut, etc.) therethrough. This arrangement allows the included angle between the floors 24 of the two base plates 22a to be adjusted as required to match the gable angle of the roof crest C. Thus, the roof crest base plate assembly 12 of the present invention may be used on roofs having any gable angle, and obviates the need for a series of roof crest plates each having different included angles for different roof crest gable angles.

Figure 3:
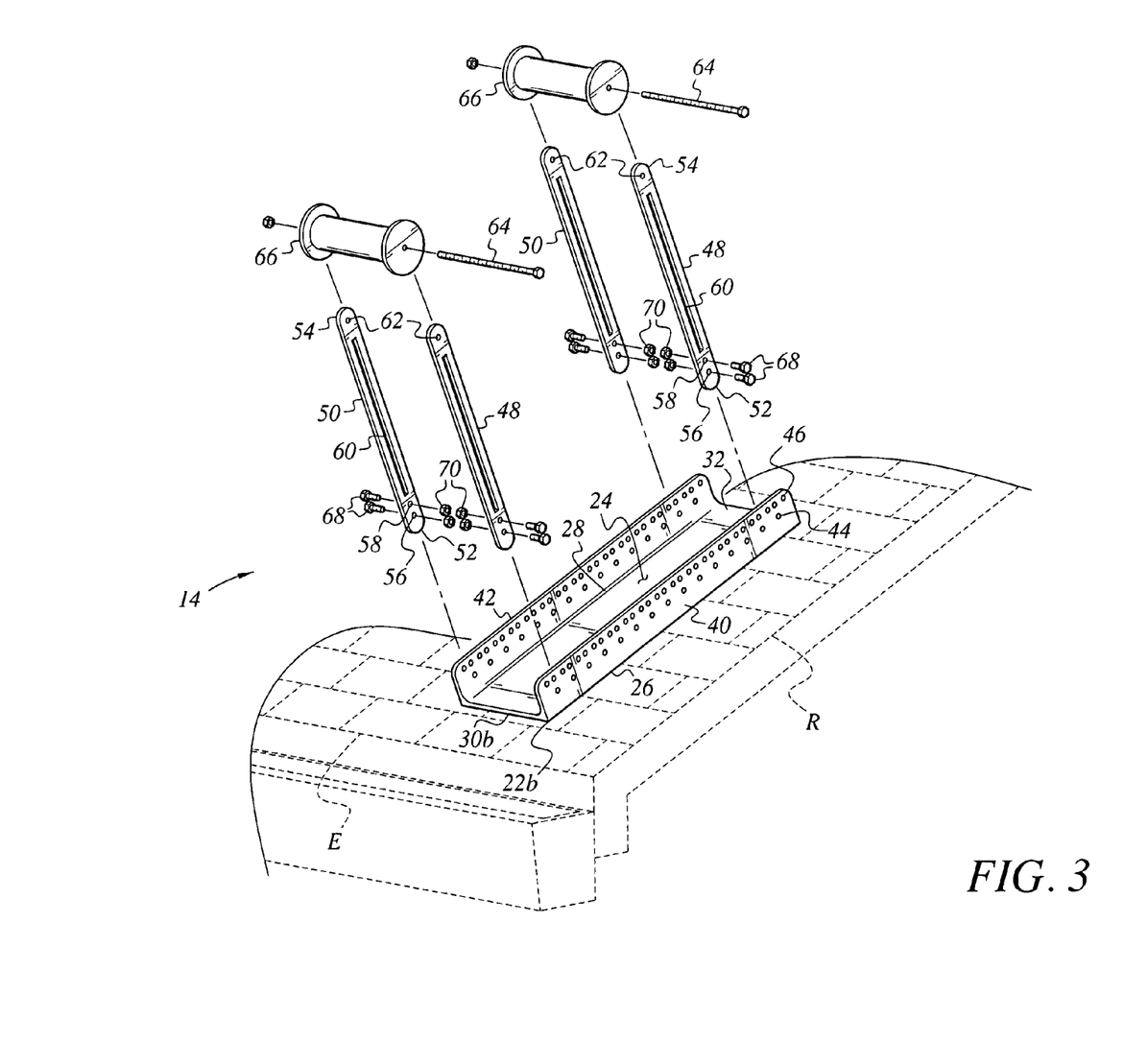
FIG. 3 is an exploded, perspective view of a wind cap assembly of the present invention for installation at the eaves or along an intermediate portion of a roof, showing various details of the invention.

FIG. 3 of the drawings provides an exploded perspective view of a single base plate assembly 14, for removable placement along some intermediate area or at the eaves E of the roof R. The assembly 14 includes only a single base plate 22b, as no mating plate need be attached thereto to span the roof crest, as in the plate assembly 12 of FIG. 2. The plate 22b has a configuration closely matching that of each of the plates 22a of FIG. 2. The plate 22b has a floor 24 with opposed first and second edges 26 and 28 and opposed first and second ends 30b and 32. The bottom surface of the floor 24 is smooth and devoid of any means for positive attachment to an underlying structure, just as in the case of the base plates 22a of the roof crest plate assembly 12 of FIG. 2.

The only difference between the single base plate assembly 14 of FIG. 3 and the roof crest paired base plate assembly 12 of FIG. 2, is the omission of the hinge lugs along the first end 30b of the floor 24 of the single base plate 22b of FIG. 3. Such hinge lugs are not required with single base plate installations, as it is not necessary to attach such single plates to another plate or other structure. However, it will be seen that a single roof crest base plate 22a of the assembly 12 of FIG. 2 may be used along the intermediate or eaves portion of the roof R if so desired, merely by pulling the hinge pin 38 from the hinge lugs 36 to separate the two plates 22a from one another for single plate installation. This simplifies the manufacture of the base plates of the present invention, as only a single plate configuration is needed.

Each of the base plates 22a and 22b of the plate assemblies 12 and 14 of FIGS. 2 and 3 includes opposed first and second flanges 40 and 42 respectively extending from the first and second edges 26 and 28 of the floor 24. The two flanges 40 and 42 of each of the base plates 22a and 22b are essentially parallel to one another, and essentially normal to the plane of the floor 24, so that each base plate 22a and 22b essentially defines a U-shaped channel.

The flanges 40 and 42 each have a first or lower row 44 and a second or upper row 46 of roller arm attachment holes therethrough for the removable and adjustable attachment of a first and a second elongate roller or bearing attachment arm, respectively 48 and 50, to the respective base plate flanges 40 and 42. The arms 48 and 50 are always installed in pairs to the opposed flanges 40 and 42 of the underlying base plates 22a and 22b, directly opposite one another to provide for the installation of a transverse bearing across the upper ends of the arms 48 and 50 of each arm pair. Each of the arms 48 and 50 has a base flange attachment end 52 and an opposite roller or bearing attachment end 54. Each of the base flange attachment ends 52 preferably includes a first or lower and a second or upper flange attachment hole therethrough, respectively holes 56 and 58. The flange attachment holes 56 and 58 respectively align with a pair of holes of the lower and upper rows of holes 44 and 46 in the flanges 40 and 42 of the base plates 22a and 22b, when the arms 48 and 50 are positioned normal to the plane of the base plate floor 24.

Each of the arms 48 And 50 further includes an elongate slot 60 formed therethrough, extending from a point adjacent the second or upper flange attachment hole 58 to a point near the roller or bearing attachment end 54. The slot 60 may extend downwardly to join and be continuous with the second or upper flange attachment hole 58, if so desired. The roller or bearing attachment end 54 of each of the roller bearing support arms 48 and 50 also includes a separate bearing axle hole 62 therethrough, for the installation of a bearing axle 64 (e.g. elongate bolt and nut, etc.) across each support arm pair. Preferably, a flanged roller 66 is installed on each of the bearing axles 64 between the opposite upper or roller bearing ends 54 of each pair of opposed arms 48 and 50. Other tiedown bearing means, e.g. a plain shaft, may be provided as desired, although the low friction of the roller 66 is preferred.

The base flange attachment ends 52 of the bearing attachment arms 48 and 50 are adjustably and removably secured to the respective flanges 40 and 42 of the base plates 22a or 22b by means of a series of bolts 68 and mating nuts 70. In FIGS. 2 and 3, the arms 48 and 50 are shown as being normal to the planes of the floors 24 of the respective base plates 22a and 22b of the assemblies 12 and 14. This is achieved by aligning the first or lower hole 56 of each arm 48 and 50 with a selected one of the holes of the first or lower row of holes 44 in each flange 40 and 42, installing a bolt 68 therethrough, and securing the assembly with a nut 70.

The second or upper hole 58 in each arm 48 and 50 aligns with a corresponding one of the second or upper row of holes 46 in each base plate flange 40 and 42 when the arms 48 and 50 are normal to the floors 24 of the respective base plates 22a and 22b to which they are secured, and are locked immovably in place by bolts 68 and nuts 70 in the conventional manner. The arms 48 and 50 may be installed using any of the numerous first row holes 44 of the flanges 40 and 42 as desired, with the additional second row holes 46 assuring that each of the first row holes 44 will have a second row hole 46 positioned immediately thereabove and in alignment with the second hole 58 of each arm 48 and 50.

Figure 4:
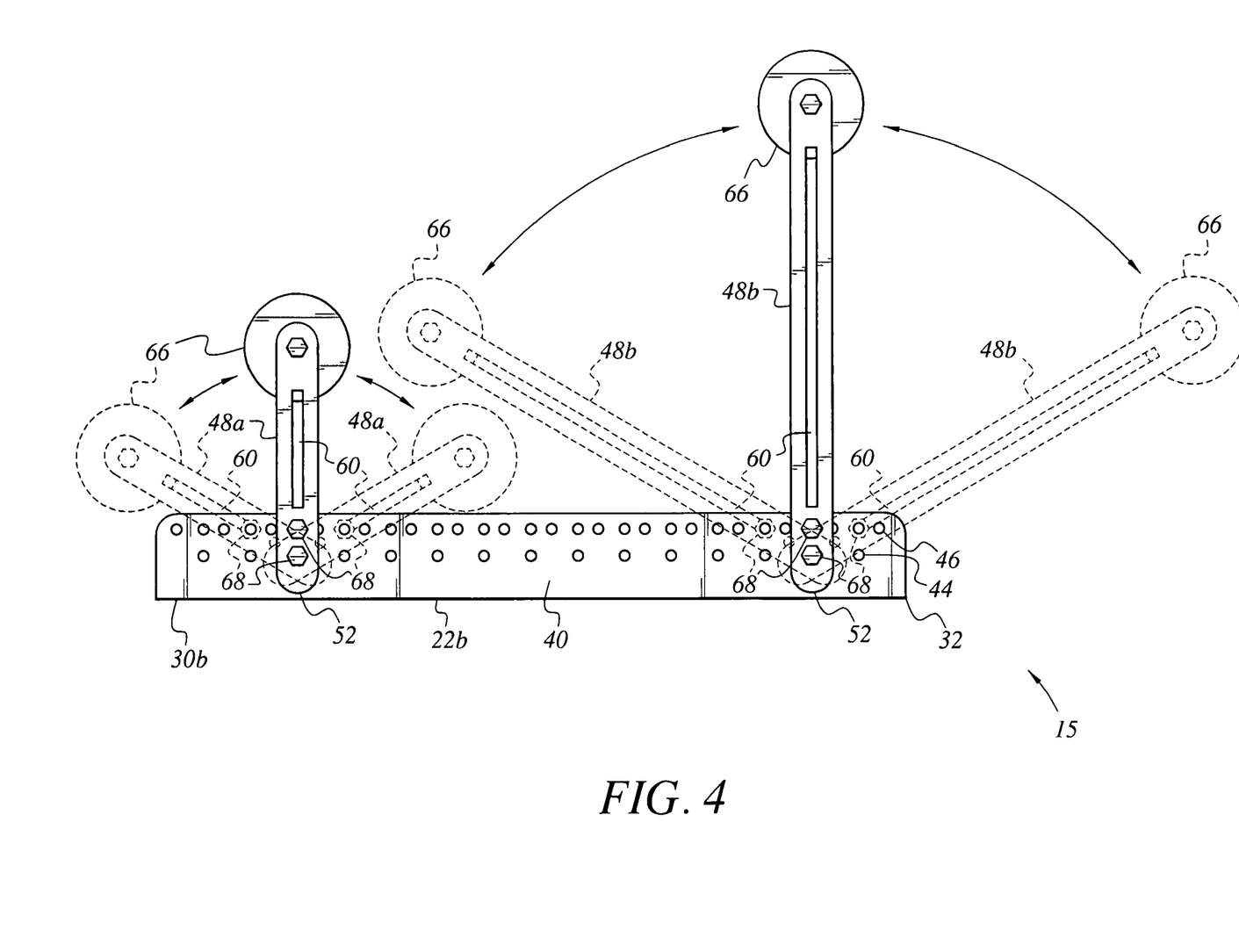
FIG. 4 is a side elevation view of an alternative embodiment wind cap assembly, showing alternative length roller support arms and alternative arm positions.

FIG. 4 provides a side elevation view of another embodiment of the present invention, designated as base plate assembly 15. The base plate 22b itself will be seen to be identical to the base plate 22b of the assembly 22b of FIG. 3, having a floor (not shown in FIG. 4) and two opposed flanges (with only the first flange 40 being shown in FIG. 4). However, one set of the bearing attachment arms differs somewhat from those illustrated in other Figures, with an alternative shorter arm being illustrated as the first arm 48a toward the left or first end 30b of the base plate 22b. A pair of bearing attachment arms somewhat longer than the arms 48 and 50 is attached adjacent the opposite second end 32 of the base plate 22b of FIG. 4, with only the first arm 48b being shown in FIG. 4 due to the alignment of components in the elevation view. It will be seen that the length of the bearing attachment arms may be selected as desired, in any of the embodiments of the present invention.

The embodiment of FIG. 4 illustrates exemplary alternative angular positions for the arms 48a and 48b, which are applicable to the arms 48 and 50 of the embodiments of FIGS. 2 and 3 as well. The arm 48a and 48b positions shown in solid lines in FIG. 4 represent the use of the lower and upper flange attachment holes (concealed by the heads of the attachment bolts 68 in FIG. 4) to secure the arms 48a and 48b to corresponding holes of the first or lower row 44 and second or upper row 46, thus positioning the arms normal to the plane of the floor of the base plate 22b. However, the arms 48a and/or 48b (as well as the arms shown in the embodiments of FIGS. 2 and 3) may be secured to the base plate flanges at some other angle than perpendicular to the floor of the base plate, if so desired.

This is shown by the alternative broken line positions of the arms 48a and 48b in FIG. 4. These positions utilize the first or lower flange attachment bolt holes in the flange attachment ends 52 of the arms 48a and 48b, and corresponding holes in the first or lower row of holes 44 along the flange 40. However, when the arms 48a and 48b are pivoted to form an acute angle with the plane of the floor of the base plate 22b, the slot 60 in each arm 48a and 48b will align with one of the holes of the upper row of holes 46 in the flange 40. The arm(s) 48a and/or 48b may be secured in such a position as exemplified by their broken line showing in FIG. 4, by installing an attachment bolt 68 and securing the bolt 68 with a nut in the conventional manner.

Figure 5:
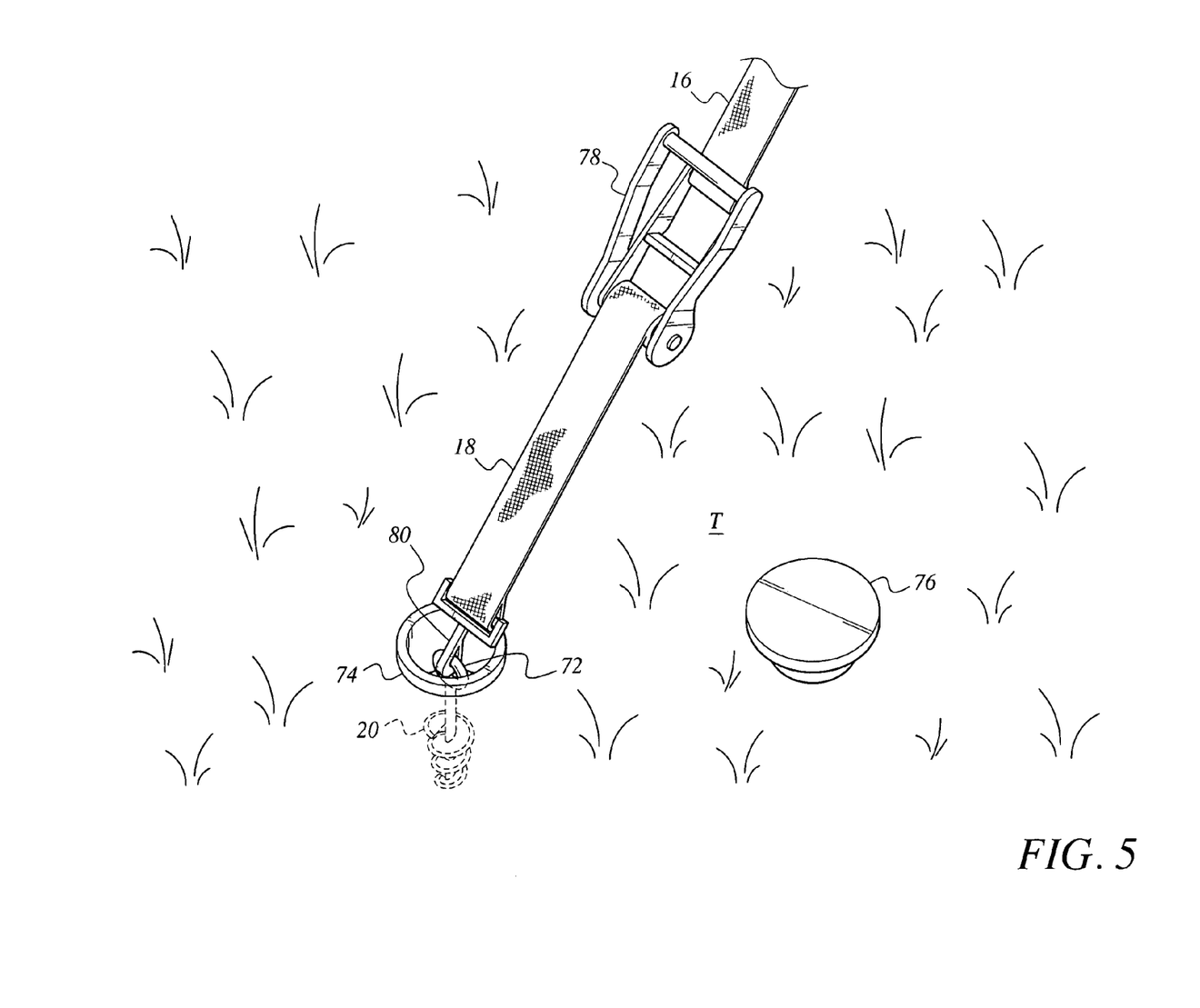
FIG. 5 is a perspective view of a ground anchor installation for the tiedown strap used with the present wind cap invention, showing various details thereof.

FIG. 5 provides a detailed perspective view of the ground anchor arrangement used to secure the tiedown strap 16 of the present wind cap system invention. In FIG. 5, a ground anchor 20 identical to the first and second ground anchors 20 illustrated in FIG. 1, is buried in the terrain T surrounding the building structure B. The ground anchor 20 may comprise a screw-in type anchor, as shown, or may alternatively comprise some other form of anchor, e.g. a buried concrete mass with an attachment ring or the like extending therefrom, etc. In any case, the attachment ring, eye, or loop 72 is preferably disposed below the surface of the terrain T, in order to preclude forming an obstruction when the tiedown strap 16 is removed therefrom. In FIG. 5, a cylindrical container or receptacle 74 is installed surrounding the tiedown attachment eye 72. This also provides for the removable installation of a cap or cover 76 to the top of the anchor receptacle and over the tiedown attachment eye 72, to prevent the filling of the anchor receptacle 74 with water and/or debris and/or to preclude inadvertently stepping in the receptacle 74 if it were left open.

The distal end 18 (i.e., first or second end of the strap 16, as shown in FIG. 1) extends from a ratchet tensioner attachment 78 at the end of the strap 16. Either, or both, ends 18 of the tiedown strap 16 may be equipped with such tensioners 78 as desired. The extreme distal ends of the tiedown strap end portions 18 are equipped with hooks or latches 80, which are removably secured to the attachment eyes 72 of the ground anchors 20.

The present wind cap apparatus for buildings is quickly and easily installed once the ground anchors 20 have been installed in the terrain T surrounding the building structure B, the tiedown straps 16 have been adjusted to provide the proper length, and the roller or bearing support arms 48 and 50 have been secured to their respective base plates 22a or 22b at the desired positions and angles. Once these initial installation steps have been completed, the assembly may be quickly and easily installed atop and across the roof R of the building structure B, perhaps in a matter of only a couple of hours or so for an average single family residential home.

As the base plate assemblies 12 and 14 have no means providing for any form of mechanical, adhesive, or other attachment to the underlying roof structure R, they may be quickly placed upon the roof R along the rafters thereof when word of approaching high winds is received. The pressure applied by the various base plate assemblies may be more widely distributed by means of boards, panels, or similar material placed beneath the base plate assemblies as desired. The tiedown straps 16 are then extended over the corresponding base plate assemblies 12, 14, and/or 15, secured to the opposed ground anchors 20, and tightened as desired (e.g., to a couple of hundred pounds or so of tension) using the ratchet tensioners 78 provided at one or both ends 18 of each of the tiedown straps 16. The compressive force developed by the tiedown straps 16 across the base plate assemblies 12, 14, and/or 15 is sufficient to hold the assemblies in place atop the roof structure R.

The various base plate assembly configurations provide for the placement of such assemblies at various locations atop the roof structure R, as required. The preferred angular displacement of the ends of the tiedown straps 16 away from the building structure B, and the height of the tiedown straps 16 above the roof R provided by the bearing attachment arms 48 and 50, provide sufficient clearance for the tiedown straps 16 over the eaves and rain gutters of the roof R, as shown in FIG. 2.

As the tiedown straps 16 are tightened, they will of course stretch and move to some extent along their lengths. With conventional roof tiedown systems, the longitudinal movement of the tiedown straps or cables as they stretch, imparts a corresponding shear load to the underlying fixed support structure and thus to the roof beneath the tiedowns. The rollers 66 or other bearing means provided atop the base plate assemblies 22a, 22b, 22c of the present invention preclude transfer of the forces developed along the lengths of the tiedown straps 16 to the underlying structure, thus resulting in purely compressive loads or forces upon the roof structure R when the present invention is used.

Once the high wind danger has passed, the above-ground components of the present invention may be removed by loosening the ratchet tensioners, removing the tiedown straps, and removing the various base plate assemblies from the roof. The apparatus may then be stored until needed in the future. The apparatus is relatively compact when arranged for storage, and may be stored in a garage, storage shed, or other space as desired.

In conclusion, the present wind cap for building structures invention provides a considerable advantage over such devices and systems of the prior art. The roller bearings positioned above the base plates by means of the bearing attachment or support arms provide good clearance between the underlying roof structure and the tiedowns, thus preventing any chafing or abrading of the tiedowns upon the roof structure. The advantage provided by the roller bearings has been noted above, i.e. the lack of transfer of longitudinal forces developed along the tiedown straps as they are tensioned to the underlying base plate and roof structure. This results in essentially purely compressive forces being applied to the roof structure, as required to secure the roof to the underlying building structure in high winds. The versatility provided by the roller bearing attachment arms, with their variable lengths and angular attachments to the underlying base plates, results in considerable versatility for locating the base plates at various locations upon a roof structure and applying the desired downward forces as required. The present invention thus provides a cost effective means for protecting a roof and building structure from damage due to high winds, and will be appreciated by those who have need of such an assembly.

It is to be understood that the present invention is not limited to the embodiments described above, but encompasses any and all embodiments within the scope of the following claims.

I claim:

1. A wind cap for a building constructed above a surrounding terrain, comprising:
   a plurality of base plates adapted for being disposed atop the building, each of the base plates having:
      a floor having a first edge, a second edge opposite the first edge, a first end, and a second end opposite the first end;
      a first flange extending from and substantially normal to the first edge of the floor; and
      a second flange extending from and substantially normal to the second edge of said floor;
   at least one first and at least one second elongate roller attachment arm secured to and extending respectively from the first and the second flanges of each of the base plates, each of the roller attachment arms having a base flange attachment end and a roller arm attachment end opposite the base flange attachment end, each of the first and second roller attachment arms defining a roller attachment arm pair;
   a tiedown strap roller disposed between the roller arm attachment end of the first and second roller attachment arms;
   a plurality of tiedown straps having a first end and an opposite second end, the straps passing over and bearing against the roller of the roller attachment arm pair in order to hold each of the base plates securely atop the building;
   a first ground anchor secured to the first end of each of the tiedown straps; and
   a second ground anchor secured to the second end of each of the tiedown straps, the first and second ground anchors being adapted for permanent anchoring within the surrounding terrain on opposite sides of the building from one another.

2. The wind cap for a building according to claim 1, wherein:
   each said flange has an upper row and a lower row of roller arm attachment holes defined therethrough;
   said base flange attachment end of each said roller attachment arm has at least a lower flange attachment hole defined therethrough; and
   at least a lower arm attachment bolt is selectively installed through a corresponding one of said roller arm attachment holes of each said flange and through the corresponding said flange attachment hole of each said roller attachment arm, adjustably and removably securing each said roller attachment arm to a corresponding said flange of each of said base plates.

3. The wind cap for a building according to claim 2, wherein each said roller attachment arm has an elongate slot defined therein, whereby each said roller attachment arm is selectively secured to a corresponding said flange of one of said base plates at a predetermined angle by said lower arm attachment bolt passing through said lower flange attachment hole of said roller attachment arm and through one of said lower row of roller arm attachment holes of said flange and said upper arm attachment bolt passing through said elongate slot of said roller attachment arm and through one of said upper row of roller arm attachment holes of said flange.

4. The wind cap for a building according to claim 1, further including a roller axle bolt disposed between each said roller arm attachment end of each said roller attachment arm pair, each said tiedown strap roller being disposed upon a corresponding said roller axle bolt.

5. The wind cap for a building according to claim 1, further including:
   a plurality of mutually complementary hinge lugs extending from the first end of each of said base plates; and
   a hinge pin extending through said hinge lugs of two said base plates, pivotally securing the two said base plates together along each of the first ends thereof and forming an angularly adjustable roof crest base plate assembly.

6. The wind cap for a building according to claim 1, wherein each said ground anchor is adapted for being buried within the surrounding terrain, the wind cap further comprising a cover removably placed over each said ground anchor when a corresponding one of said tiedown straps is disconnected therefrom.

7. The wind cap for a building according to claim 1, further including a ratchet attachment disposed on at least one of the ends of each of said tiedown straps.

8. A wind cap for a building constructed above a surrounding terrain, comprising:
   a plurality of base plates adapted for being disposed atop the building, each of the base plates having:
      a floor having a first edge, a second edge opposite the first edge, a first end, and a second end opposite the first end; and
      first and second flanges extending from and substantially normal to the first and second edges of said floor, respectively, each of the flanges having an upper row and a lower row of bearing arm attachment holes defined therein;
   at least one first and at least one second elongate bearing attachment arm defining at least one bearing attachment arm pair, the arms extending respectively from the first and second flanges of each of the base plates, each of the bearing attachment arms having a base flange attachment end and a bearing arm attachment end opposite the base flange attachment end, the base flange attachment end having upper and lower flange attachment holes defined therein;
   at least one lower arm attachment bolt selectively installed through an opposing pair of the bearing arm attachment holes and one of the flange attachment holes of each of the bearing attachment arms, adjustably and removably securing each of the bearing attachment arms to the base plates;
   a tiedown strap bearing disposed between each of the bearing arm attachment ends of the bearing attachment arm pair;

a plurality of tiedown straps having a first end and an opposite second end, each of the straps passing over and bearing against the bearing of the bearing attachment arm pair, thereby holding each of the base plates securely atop the building;

first and second ground anchors secured to the first and second ends, respectively, of each of the tiedown straps, the first and said second ground anchors being adapted for permanent anchoring within the surrounding terrain on opposite sides of the building from one another.

9. The wind cap for a building according to claim 8, wherein each said tiedown strap bearing comprises:

a roller axle bolt extending across each corresponding said bearing arm attachment pair; and a roller installed upon each said roller axle bolt.

10. The wind cap for a building according to claim 8, wherein each said bearing attachment arm has an elongate slot defined therein, the wind cap further including a plurality of upper arm attachment bolts, whereby each said bearing attachment arm is selectively secured to a corresponding said flange of one of said base plates at a predetermined angle by said lower arm attachment bolt passing through said lower flange attachment hole of said bearing attachment arm and through one of said lower row of bearing arm attachment holes of said flange and one of said upper arm attachment bolts passing through said elongate slot of said bearing attachment arm and through one of said upper row of bearing arm attachment holes of said flange.

11. The wind cap for a building according to claim 8, further including:

a plurality of mutually complementary hinge lugs extending from said first end of each of said base plates; and a hinge pin extending through said hinge lugs of two said base plates, pivotally securing the two said base plates together along each said first end thereof and forming an angularly adjustable roof crest base plate assembly.

12. The wind cap for a building according to claim 8, wherein each said ground anchor is adapted for being buried within the surrounding terrain, the wind cap further comprising a cover removably placed over each said ground anchor when a corresponding one of said tiedown straps is disconnected therefrom.

13. The wind cap for a building according to claim 8, further including a ratchet attachment disposed on at least one of the ends of each of said tiedown straps.

14. A wind cap for a building constructed above a surrounding terrain, comprising:

a plurality of base plates removably disposed atop the building, each of the base plates being a U-shaped channel having a floor and opposing first and second flanges, the floor having a smooth bottom surface;

at least one first and at least one second elongate bearing attachment arm defining at least one bearing attachment arm pair, the arms being secured to and extending respectively from the first and second flanges of each of the base plates, each of the bearing attachment arms having a base flange attachment end and an opposing bearing arm attachment end;

a bearing disposed between each of the bearing arm attachment ends of the bearing attachment arm pair;

a plurality of tiedown straps having a first end and an opposite second end, the straps passing over and bearing against the bearings in order to hold each of the base plates securely atop the building;

first and second ground anchors secured to the first and second ends of each of the tiedown straps, the anchors being adapted for permanent anchoring within the surrounding terrain on opposite sides of the building from one another.

15. The wind cap for a building according to claim 14, wherein each said tiedown strap bearing comprises:

a roller axle bolt extending across each corresponding said bearing arm attachment pair; and a roller installed upon each said roller axle bolt.

16. The wind cap for a building according to claim 14, wherein each said flange has an upper row and a lower row of roller arm attachment holes defined therethrough, and said base flange attachment end of each said roller attachment arm has upper and lower flange attachment holes defined therethrough, the wind cap further comprising an upper and a lower arm attachment bolt selectively installed through corresponding said roller arm attachment holes of each said flange and through corresponding said flange attachment holes of each said roller attachment arm, adjustably and removably securing each said roller attachment arm to a corresponding said flange of each of said base plates.

17. The wind cap for a building according to claim 14, wherein each said flange further including an upper row and a lower row of roller arm attachment holes defined therethrough, and said base flange attachment end of each said roller attachment arm has at least a lower flange attachment hole and an elongate slot defined therethrough the wind cap further including a plurality of lower and upper arm attachment bolts, whereby each said bearing attachment arm is selectively secured to a corresponding said flange of one of said base plates at a predetermined angle by one of said lower arm attachment bolts passing through said lower flange attachment hole of said bearing attachment arm and through one of said lower row of bearing arm attachment holes of said flange and one of said upper arm attachment bolts passing through said elongate slot of said bearing attachment arm and through one of said upper row of bearing arm attachment holes of said flange.

18. The wind cap for a building according to claim 14, further including:

a plurality of mutually complementary hinge lugs extending from said first end of each of said base plates; and a hinge pin extending through said hinge lugs of two said base plates, pivotally securing the two base plates together along each said first end thereof and forming an angularly adjustable roof crest base plate assembly.

19. The wind cap for a building according to claim 14, wherein each said ground anchor is adapted for being buried within the surrounding terrain, the wind cap further comprising a cover removably placed over each said ground anchor when a corresponding one of said tiedown straps is disconnected therefrom.

20. The wind cap for a building according to claim 14, further including a ratchet attachment disposed on at least one the ends of each of said tiedown straps.

* * * * *